(12) United States Patent
Lee

(10) Patent No.: US 6,650,096 B2
(45) Date of Patent: Nov. 18, 2003

(54) MULTIPLE PHASE SWITCHING REGULATOR CIRCUITS SENSING VOLTAGES ACROSS RESPECTIVE INDUCTANCES

(75) Inventor: Ken K. Lee, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/325,910

(22) Filed: Dec. 19, 2002

(65) Prior Publication Data

US 2003/0085692 A1 May 8, 2003

Related U.S. Application Data

(62) Division of application No. 09/717,766, filed on Nov. 21, 2000, now Pat. No. 6,534,962.

(51) Int. Cl.[7] .................................................. G05F 1/40

(52) U.S. Cl. ....................................... 323/272; 323/290
(58) Field of Search ................................. 323/224, 268, 323/272, 270, 290

(56) References Cited

U.S. PATENT DOCUMENTS

| | | | | |
|---|---|---|---|---|
| 5,808,453 A | * | 9/1998 | Lee et al. | 323/224 |
| 6,292,378 B1 | * | 9/2001 | Brooks et al. | 363/65 |
| 6,346,798 B1 | * | 2/2002 | Passoni et al. | 323/272 |
| 6,424,129 B1 | * | 7/2002 | Lethellier | 323/272 |

\* cited by examiner

*Primary Examiner*—Shawn Riley
(74) *Attorney, Agent, or Firm*—Trop, Pruner & Hu, P.C.

(57) ABSTRACT

A switching regulator includes an inductive element to provide a first voltage across the element and at least one switch to energize and de-energize the inductive element to produce an output voltage. A controller of the regulator constructs an indication of a current from the first voltage and operates the switch(es) to regulate the output voltage in response to the indication.

10 Claims, 6 Drawing Sheets

MULTIPLE PHASE SWITCHING REGULATOR CIRCUITS SENSING VOLTAGES ACROSS RESPECTIVE INDUCTANCES

This is a divisional of application Ser. No. 09/717,766 filed on Nov. 21, 2000, now U.S. Pat. No. 6,534,962.

BACKGROUND

The invention generally relates to a voltage regulation system having an inductive current sensing element.

A DC-to-DC voltage regulator typically is used to convert a DC input voltage to either a higher or a lower DC output voltage. One type of voltage regulator is a switching regulator that is often chosen due to its small size and efficiency. The switching regulator typically includes one or more switches that are rapidly opened and closed to transfer energy between an inductor (a stand-alone inductor or a transformer, as examples) and an input voltage source in a manner that regulates the output voltage.

Figure 1:
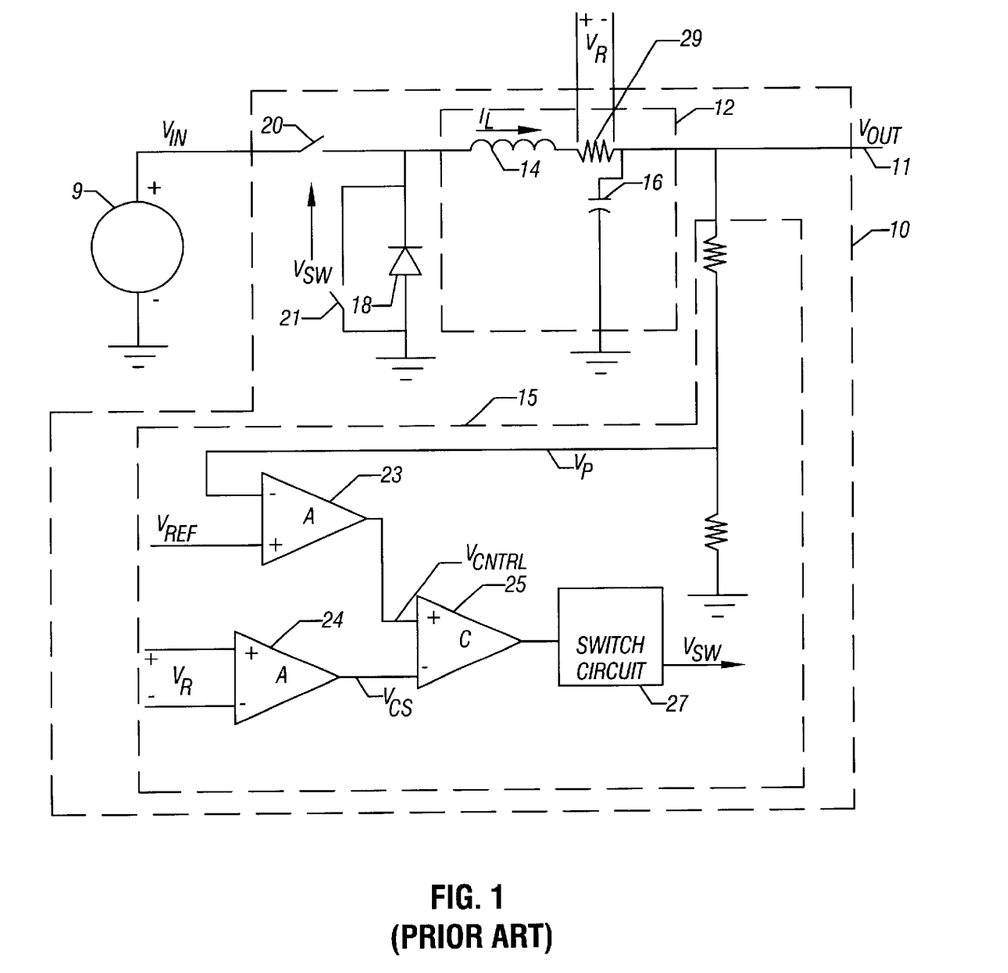
FIG. 1 is a schematic diagram of a switching voltage regulator of the prior art.

As an example, referring to FIG. 1, one type of switching regulator is a Buck switching regulator 10 that receives an input DC voltage (called $V_{IN}$) and converts the $V_{IN}$ voltage to a lower regulated output voltage (called $V_{OUT}$) that appears at an output terminal 11. To accomplish this, the regulator 10 may include a switch 20 (a metal-oxide-semiconductor field-effect-transistor (MOSFET), for example) that is operated (via a switch control signal called $V_{SW}$) in a manner to regulate the $V_{OUT}$ voltage, as described below.

Figure 2:
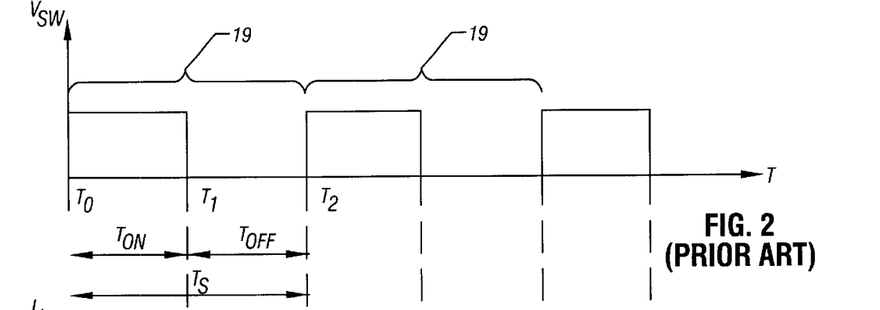
FIGS. 2, 3, 4 and 5 are waveforms that illustrate operation of the regulator of FIG. 1.
Figure 3:
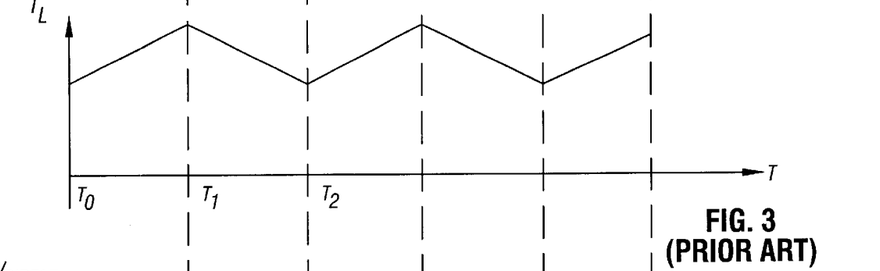

Referring also FIGS. 2 and 3, in particular, the switch 20 opens and closes to control energization/de-energization cycles 19 (each having a duration called $T_S$) of an inductor 14. In each cycle 19, the regulator 10 asserts, (drives high, for example) the $V_{SW}$ signal during an on interval (called $T_{ON}$) to close the switch 20 and transfer energy from an input voltage source 9 to the inductor 14. During the $T_{ON}$ interval, a current (called $I_L$) of the inductor 14 has a positive slope. During an off interval (called $T_{OFF}$) of the cycle 19, the regulator 10 deasserts (drives low, for example) the $V_{SW}$ voltage to open the switch 20 and isolate the input voltage source 9 from the inductor 14. At this point, the level of the $I_L$ current is not abruptly halted, but rather, a diode 18 begins conducting to transfer energy from the inductor 14 to a bulk capacitor 16 and a load (not shown) that are coupled to the output terminal 11. During the $T_{OFF}$ interval, the $I_L$ current has a negative slope, and the regulator 10 may close a switch 21 to shunt the diode 18 to reduce the amount of power that is otherwise dissipated by the diode 18. The bulk capacitor 16 serves as a stored energy source that is depleted by the load, and additional energy is transferred from the inductor 14 to the bulk capacitor 16 during each $T_{ON}$ interval.

For the Buck switching regulator, the ratio of the $T_{ON}$ interval to the $T_S$ interval (i.e., the summation of the $T_{ON}$ and $T_{OFF}$ intervals) is called a duty cycle of the regulator and generally governs the ratio of the $V_{OUT}$ voltage to the $V_{IN}$ voltage. Thus, to increase the $V_{OUT}$ voltage, the duty cycle of the regulator may be increased, and to decrease the $V_{OUT}$ voltage, the duty cycle may be decreased.

As an example, the regulator 10 may include a controller 15 (see FIG. 1) that regulates the $V_{OUT}$ voltage by using a current mode control technique. In this manner, the controller 15 may include an error amplifier 23 that amplifies the difference between a reference voltage (called $V_{REF}$) and a voltage (called $V_P$ (see FIG. 1)) that is proportional to the $V_{OUT}$ voltage to produce an error voltage (called $V_{CNTRL}$) that is used to control the levels of the $V_{OUT}$ voltage and the $I_L$ inductor current.

Figure 5:
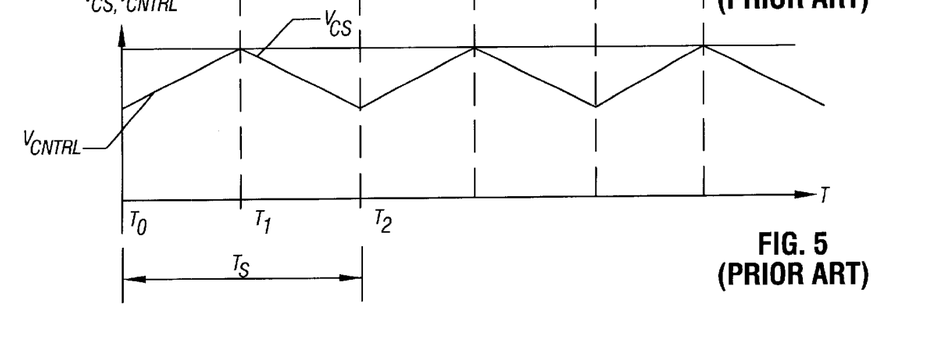

The controller 15 uses the $V_{CNTRL}$ voltage and a voltage (called $V_{CS}$) that indicates the $I_L$ inductor current to produce the $V_{SW}$ switch control signal to control the switch 20. More specifically, referring also to FIG. 5, the controller 15 may include a comparator 26 that compares the $V_{CNTRL}$ and $V_{CS}$ voltages. The $V_{CS}$ voltage is provided by a differential amplifier 24 that senses the voltage difference (called $V_R$) across a current sensing resistor 29 that is coupled in series with the inductor 14.

The output terminal of the comparator 26 may be coupled to a switch circuit 27 that generates the $V_{SW}$ switch control signal. As an example of one type of current mode control, the switch circuit 27 may keep the $T_{OFF}$ time interval constant and use the positive incline of the $V_{CS}$ voltage to control the duration of the $T_{ON}$ time interval. Thus, the $T_{ON}$ time interval ends when the $V_{CS}$ voltage reaches the $V_{CNTRL}$ voltage and begins at the expiration of the constant $T_{OFF}$ interval.

Figure 4:
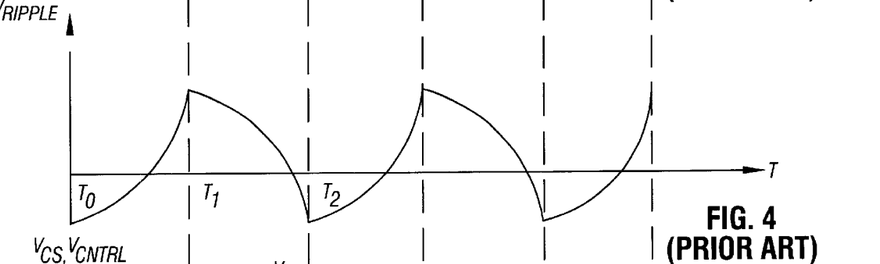

Due to the above-described arrangement, when the $V_{OUT}$ voltage increases, the $V_{CNTRL}$ voltage decreases and causes the duty cycle of the regulator 10 to decrease to counteract the increase in $V_{OUT}$. Conversely, when the $V_{OUT}$ voltage decreases, the $V_{CNTRL}$ voltage increases and causes the duty cycle to increase to counteract the decrease in $V_{OUT}$. When the average value, or DC component, of the $I_L$ current increases, the DC component of the $V_{CS}$ voltage increases and causes the duty cycle to decrease to counteract the increase in the $I_L$ current. Conversely, when DC component of the $I_L$ current decreases, the DC component of the $V_{CS}$ voltage decreases and causes the duty cycle to increase to counteract the decrease in the $I_L$ current. The switching frequency (i.e., $1/T_S$) typically controls the magnitude of an AC ripple component (called $V_{RIPPLE}$ (see FIG. 4)) of the $V_{OUT}$ voltage, as a higher switching frequency typically reduces the magnitude of the $V_{RIPPLE}$ voltage.

The regulator 10 is a single phase regulator. However, multiple regulators may be coupled in parallel to form a multiple phase voltage regulation system. In this manner, the input terminals of the regulators are coupled together, and the output terminals of the regulators are coupled together. The energization/de-energization cycles of the regulators are controlled so that the cycles are interleaved, or phased, with respect to each other. Such an arrangement is desirable because the phasing ensures that the entire voltage regulation system operates at a higher frequency than the frequency of any of the individual regulators.

The current sensing resistor 29 may occupy a substantial amount of printed circuit board space, may contribute significantly to the cost of the voltage regulation system, and may dissipate a significant amount of power especially in a multiple phase voltage regulator system that includes a multiple number of regulators and current sensing resistors 29.

Thus, there is a continuing need for an arrangement that addresses one or more of the problems that are stated above.

DETAILED DESCRIPTION

Figure 6:
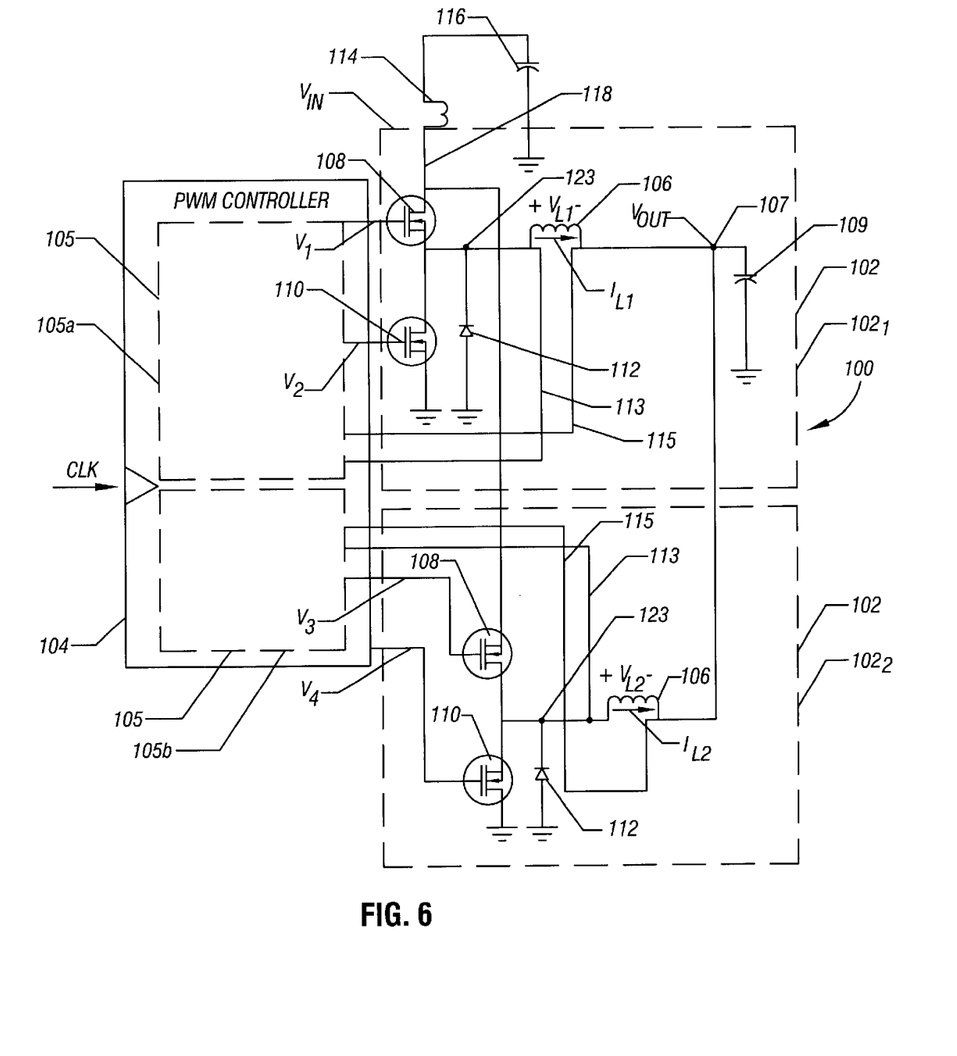
FIG. 6 is a voltage regulation system according to an embodiment of the invention.

Referring to FIG. 6, an embodiment 100 of a multiple phase voltage regulation system in accordance with the invention includes multiple Buck switching regulator stages, such as regulator stages $102_1$ and $102_2$ (each having a similar design denoted by the reference numeral "102"), that are coupled together in parallel to convert an input voltage (called $V_{IN}$) into an output voltage (called $V_{OUT}$). In this manner, both stages $102_1$ and $102_2$ receive the $V_{IN}$ input voltage and cooperate in a phased relationship with each other to regulate the $V_{OUT}$ voltage that appears at an output terminal 107 (of the system 100) that is common to both of the stages $102_1$ and $102_2$. The $V_{IN}$ voltage may be provided by a voltage regulator that receives an AC wall voltage, for example and produces a DC voltage that is filtered by a low pass filter (formed from an inductor 114 and a capacitor 116) to form the $V_{IN}$ input voltage. The stages $102_1$ and $102_2$ share a bulk capacitor 109 in common, and the bulk capacitor 109 is coupled between the output terminal 107 and ground. As described below, the power subsystem 100 also includes a pulse width modulation (PWM) controller 104 that uses a current mode technique to control the operations of both stages $102_1$ and $102_2$.

More particularly, in some embodiments of the invention, each stage 102 includes a switch 108 (a metal-oxide-semiconductor field-effect-transistor (MOSFET), for example) that is coupled between the positive terminal of an input voltage line 118 (that provides the $V_{IN}$ input voltage) and a terminal 123 of an inductor 106 (of the stage 102). The other terminal of the inductor 106 is coupled to the output terminal 107. For the stage $102_1$, a switch control signal (called $V_1$) controls the state (open or closed) of the switch 108 and for the stage $102_2$, a switch control signal (called $V_3$) controls the state (open or closed) of the switch 108.

For each stage 102, the closing of the switch 108 causes energy to be transferred from the input voltage line 118 and stored in the inductor 106 to energize the inductor 106, and the opening of the switch 108 causes the stored energy to be transferred from the inductor 106 to the output terminal 107, a transfer that de-energizes the inductor 106. In this manner, when the switch 108 is open, a diode 112 (that has its anode couple to ground and its cathode coupled to the terminal 123) conducts and/or a switch 110 (that is controlled via a switch control signal called $V_2$ (for the stage $102_1$) or a switch control signal called $V_4$ (for the stage $102_2$)) closes to couple the terminal 123 to ground to permit the flow of energy to the output terminal 107. Thus, the $V_1$ and $V_2$ signals are generally complementary signals (one has a logic one state when the other has a logic zero state and vice-versa), and the $V_3$ and $V_4$ signals are complementary signals.

In some embodiments of the invention, the controller 104 generates the $V_1$ and $V_3$ signals in a manner that causes the inductor energization/de-energization cycles of the two stages $102_1$ and $102_2$ to be shifted 180° apart. Thus, the voltage regulation system 100 that is depicted in FIG. 6 is a two phase system. In other embodiments of the invention, the voltage regulation system may have a different number of phases (other than two), and in these embodiments, the controller 104 may generate signals to control the operation of the stages 102 so that the switch control signals have the proper phase relationship. As examples, for a three phase voltage regulation system (having three stages 102) the switch control signals to control the switching states of the three switches 108 are phased to place the energization/de-energization cycles 120° apart. For a four phase voltage regulation system, the switch control signals to control the four switches 108 are phased to place the energization/de-energization cycles 90° apart, etc.

Figure 7:
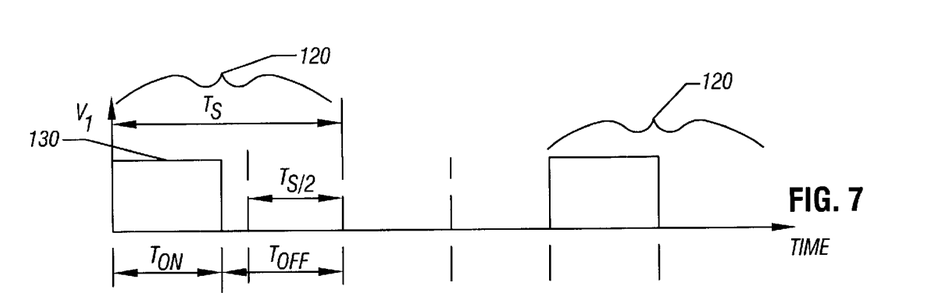
FIGS. 7, 8, 9, 10, 11 and 12 depict waveforms illustrating operation of the voltage regulation system of FIG. 6 according to an embodiment of the invention.
Figure 8:
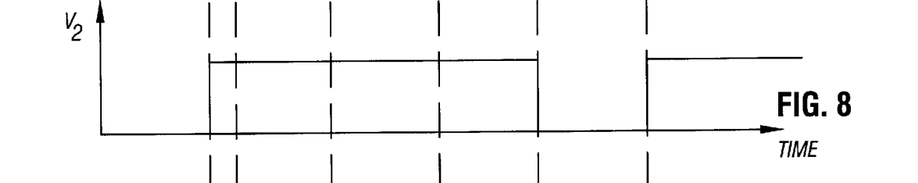

Referring to FIGS. 7, 8, 9 and 10, for the two phase design (assumed in the description below unless other-vise noted), the $V_1$ signal includes switching cycles 120 (see FIG. 7), each of which controls the switch 108 for a particular energization/de-energization cycle of the inductor 106 of the stage $102_1$. In this manner, each switching cycle 120 includes a pulse 130 that causes the switch 108 of the stage $102_1$ to conduct and has a duration that sets the on time (called $T_{ON}$) of the switching cycle 120. In some embodiments of the invention, the controller 104 controls the duration of the pulse 130 (i.e., controls the $T_{ON}$ on time) to regulate the $V_{OUT}$ voltage and sets a fixed duration for the off time (called $T_{OFF}$) of the switch 108. Therefore, for the example that is depicted in FIG. 7, the pulse 130 lasts from the beginning (at time $T_0$) of the switching cycle 120 to time $T_1$. Time $T_2$ marks the midpoint of the switching cycle 120, and the switch 108 of the stage $102_1$ remains off (from time $T_1$) until time $T_3$, the time at which the switching cycle 120 ends. As depicted in FIGS. 7 and 8, the $V_1$ and $V_2$ signals are complementary.

Figure 9:
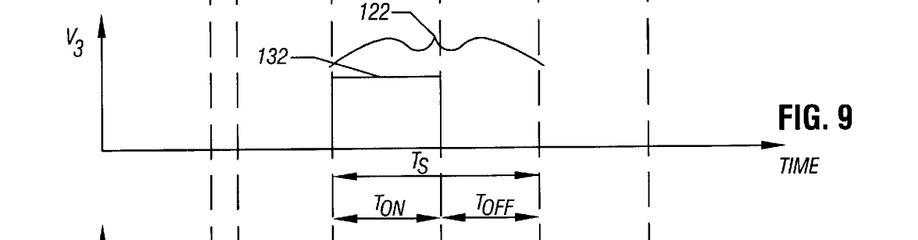
Figure 10:
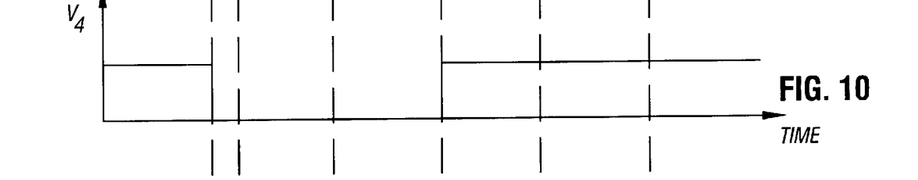

For the other stage $102_2$, the $V_3$ signal includes switching cycles 122 that are complementary to the switching cycles 120, as the stages $102_1$ and $102_2$ operate 180° out of phase. In this manner, as depicted in FIG. 9, a particular switching cycle 122 begins at time $T_3$ at the expiration of the switching cycle 120. Each switching cycle 122 includes a pulse 132 in which the switch 108 of the stage $102_2$ conducts and has a duration that sets the on time of the switching cycle 122. When the switching cycle 122 elapses, another switching cycle 120 occurs, then another switching cycle 122 occurs, etc. As depicted in FIGS. 9 and 10, the $V_3$ and $V_4$ signals are complementary.

Figure 11:
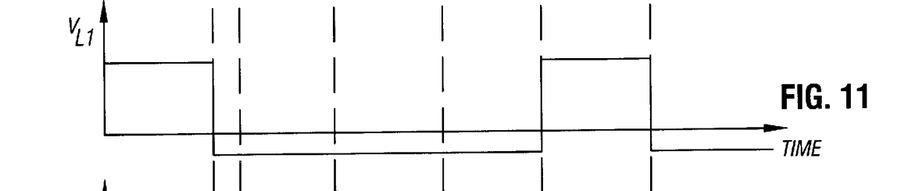
Figure 12:
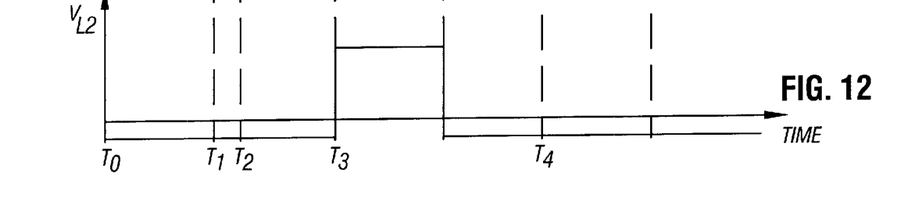

Unlike conventional systems, the system 100 uses a current mode control technique without using explicit current sensing devices (such as current sensing resistors) to sense inductor currents in the stages 102. Instead, the system 100 uses the inductor 106 of each stage 102 as a current sensing element. In this manner, as described below, the PWM controller 104 measures the voltage (called $V_{L1}$ (see FIG. 11) for the stage $102_1$ called $V_{L2}$ (see FIG. 12) for the stage $102_2$) across each inductor 106 and uses these measured inductor voltages to sense the inductor currents in the stages $102_1$ and $102_2$.

Figure 13:
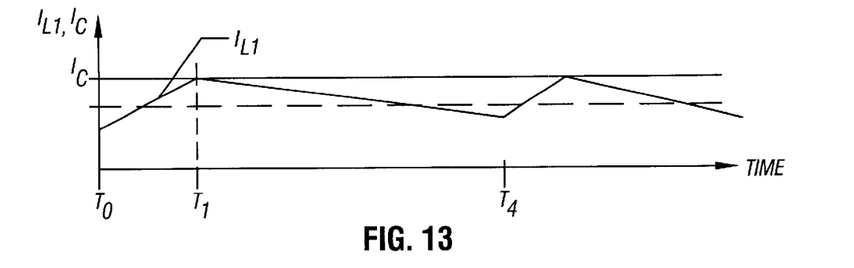
FIG. 13 depicts waveforms illustrating a current mode control scheme according to an embodiment of the invention.

More specifically, as described below, the controller 104 uses a particular voltage of an inductor to reconstruct the current in the inductor. For example, for the stage $102_1$, the controller 104 uses the $V_{L1}$ voltage to construct a representation of the current (called $I_{L1}$ and depicted in FIG. 13) in the inductor 106. As an example, the controller 104 may set an upper limit (called $I_C$) on the $I_{L1}$ current and operate the switch 108 accordingly. In this manner, the controller 104 may establish a constant off time for the switch 108 of the stage $102_1$ and establish the on time as the time for the $I_{L1}$ current to rise from its minimum value to the $I_C$ current. As described below, the level of the $I_C$ current may vary with the level of the $V_{OUT}$ voltage. The controller 104 may also construct a representation of the current (called $I_{L2}$) of the inductor 106 of the stage $102_2$ from the $V_{L2}$ inductor voltage and control the operation of the switch 108 of the stage $102_2$ in a similar manner.

The controller 104 may use various other current mode control schemes, depending on the particular embodiment of the invention. However, regardless of the type of current mode control that is used, the controller 104 uses the $V_{L1}$ and $V_{L2}$ inductor voltages to sense the $I_{L1}$ and $I_{L2}$ currents.

Figure 14:
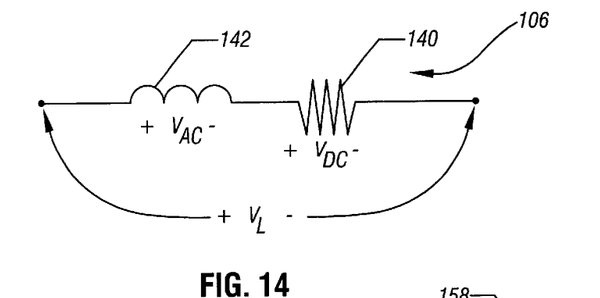
FIG. 14 is a schematic diagram of an inductor of a regulator of the voltage regulation system of FIG. 6 according to an embodiment of the invention.

For purposes of constructing the inductor's current from its voltage, the controller 104 models the inductor according to an electrical model 106 that is depicted in FIG. 14. As shown, the inductor may be modeled as an ideal winding 142 (that produces an AC voltage called $V_{AC}$) that is in series with an inherent winding resistor 140 (that produces a DC voltage called $V_{DC}$) that is introduced by the inherent winding resistance of the inductor. In this manner, the controller 104 derives the AC component of the inductor current from the $V_{AC}$ component via integration and derives the DC component of the inductor current from the $V_{DC}$ component.

Figure 15:
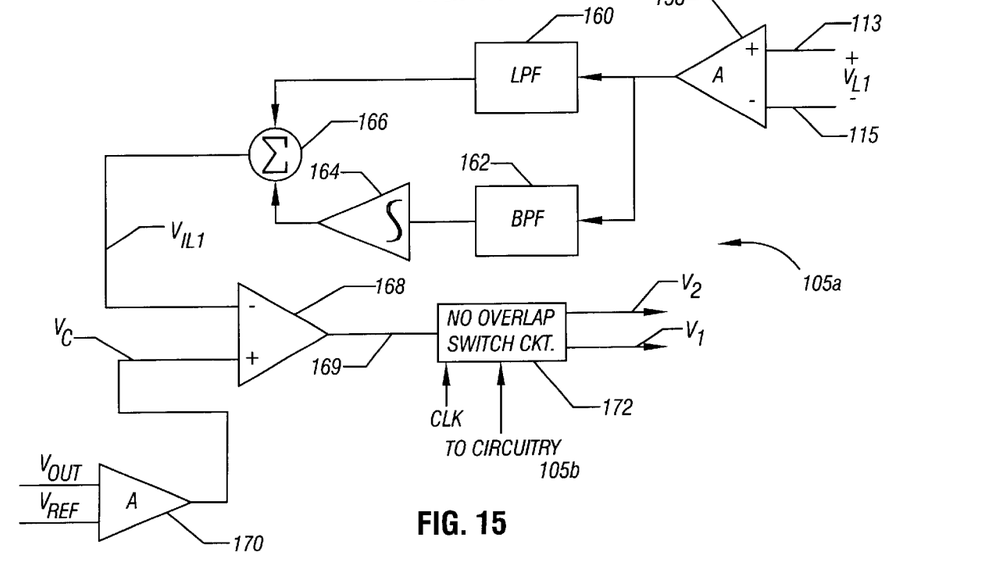
FIG. 15 is a schematic diagram of a controller of the voltage regulation system of FIG. 6 according to an embodiment of the invention.

More specifically, FIG. 15 depicts a possible embodiment of circuitry 105a (see FIG. 6) of the controller 104 to generate the $V_1$ and $V_2$ switch control signals. In this manner, the PWM controller 104 includes the circuitry 105a (see FIG. 6) to receive the $V_{L1}$ voltage (via sense lines 113 and 115 that are coupled to different terminals of the inductor 106) and generates the $V_1$ and $V_2$ switch control signals, and the PWM controller 104 includes circuitry 105b (see FIG. 6) to receive the $V_{L2}$ voltage (via sense lines 113 and 115) and generate the $V_3$ and $V_4$ switch control voltages. The circuitry 105a and 105b communicates with each other for purposes of interleaving the respective switching cycles. Because the circuitry 105a has a similar design to the circuitry 105b, only the design of the circuitry 105a is described below.

As depicted in FIG. 15, in some embodiments of the invention, the circuitry 105a includes a differential amplifier 158 that has its input terminals coupled to the sense lines 113 and 115 to receive the $V_{L1}$ inductor voltage. Thus, the output terminal of the differential amplifier 158 furnishes a signal that is indicative of the $V_{L1}$ inductor voltage. A low pass filter (LPF) 160 of the circuitry 105a filters the signal from the output terminal of the differential amplifier 158 to provide a signal (at its output terminal) that indicates the DC component of the $I_{L1}$ inductor voltage and thus, indicates the DC component of the inductor current. A bandpass filter (BPF) 162 of the circuitry 105 filters the signal that is provided by the output terminal of the differential amplifier 162 to provide a signal (at its output terminal) that indicates the AC component of the $V_{L1}$ inductor voltage. An integrator 164 integrates the signal at the output terminal of the BPF 162 to produce a signal that indicates the AC component of the $I_{L1}$ inductor current. An adder 166 of the circuitry 105 receives the signals from the output terminals of the LPF 160 and the integrator 164 and furnishes a signal (called $V_{IL1}$) at its output terminal that indicates the $I_{L1}$ inductor current.

In some embodiments of the invention, the circuitry 105a includes a comparator 168 that compares the $V_{IL1}$ signal with a signal (called $V_C$) that sets the maximum level of the $I_{L1}$ inductor current. In some embodiments of the invention, the $V_C$ signal is finished by the output terminal of an error differential amplifier 170 that compares the $V_{OUT}$ voltage with a reference voltage (called $V_{REF}$). Due to this arrangement, the signal at the output terminal of the comparator 168 indicates when the switch 108 should be opened and closed, as the signal transitions between states when the $V_{IL1}$ voltage reaches the $V_C$ voltage to indicate the end of the on time interval. A switch circuit 172 is coupled to the output terminal of the comparator 168 and is also coupled to the circuitry 105b to control the on and off time switching intervals (based on the signal at the output terminal of the comparator 168) during the appropriate switching cycle.

Figure 16:
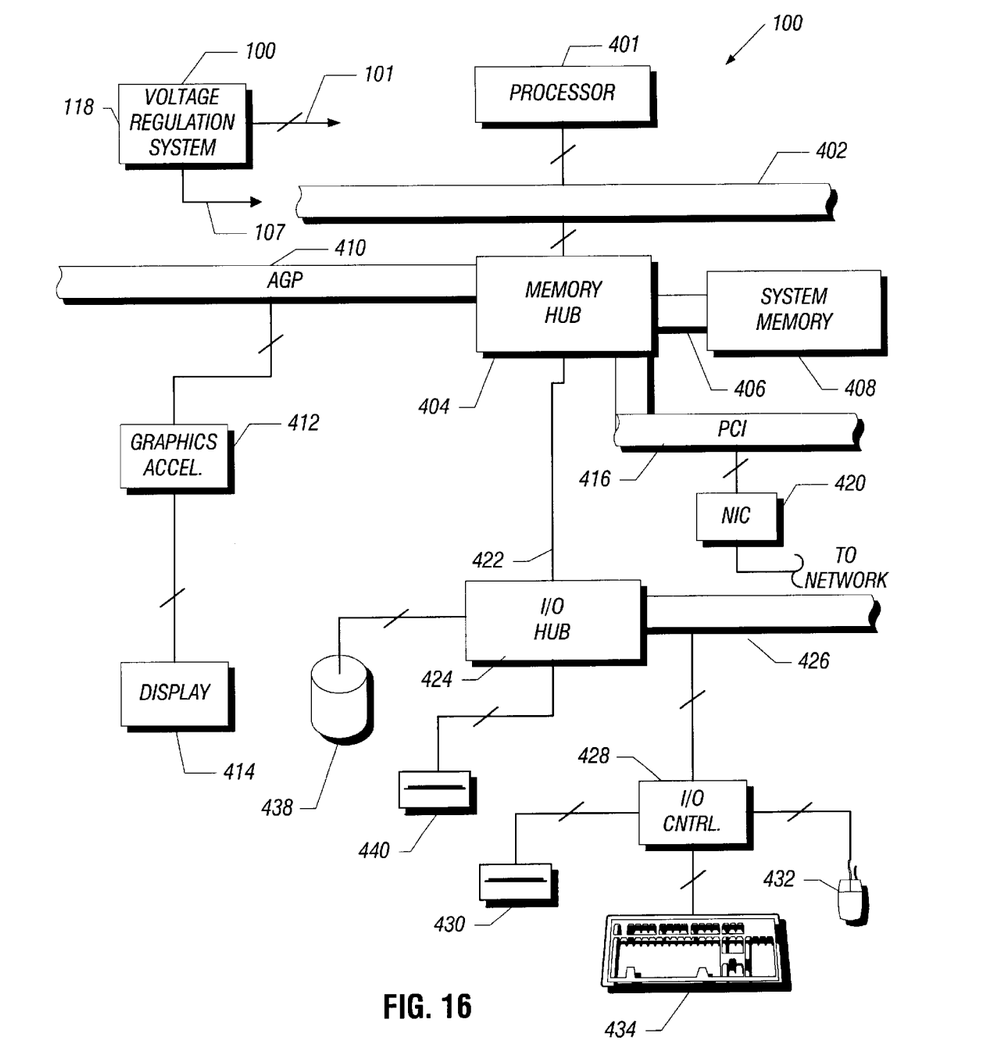
FIG. 16 is a schematic diagram of a computer system according to an embodiment of the invention.

Referring to FIG. 16, in some embodiments of the invention, the voltage regulation system 100 may furnish power (via one or more voltage communication lines that extend from the output terminal 107, for example) to a processor 401 and other components of a computer system 400. In this context, the term "processor" may refer to, as examples, to at least one microcontroller, X86 microprocessor, Advanced RISC Machine (ARM) microprocessor or Pentium microprocessor. Other types of processors are possible and are within the scope of the following claims.

The processor 401 may be coupled to a local bus 402 along with a north bridge, or memory hub 404. The memory hub 422 may represent a collection of semiconductor devices, or a "chip set," and provide interfaces to a Peripheral Component Interconnect (PCI) bus 416 and an Accelerated Graphics Port (AGP) bus 410. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A graphics accelerator 412 may be coupled to the AGP bus 410 and provide signals to drive a display 414. The PCI bus 416 may be coupled to a network interface card (NIC) 420, for example. The memory hub 404 may also provide an interface to a memory bus 406 that is coupled to a system memory 408.

A south bridge, or input/output (I/O) hub 424, may be coupled to the memory hub 404 via a hub link 422. The I/O hub 424 represents a collection of semiconductor devices, or a chip set, and provides interfaces for a hard disk drive 438, a CD-ROM drive 440 and an I/O expansion bus 426, as just a few examples. An I/O controller 428 may be coupled to the I/O expansion bus 426 to receive input data from a mouse 432 and a keyboard 434. The I/O controller 428 may also control operations of a floppy disk drive 430.

Other embodiments are within the scope of the following claims. For example, in other embodiments of the invention, a topology (a forward, flyback or a Boost converter topology, as examples) other than a Buck converter topology may be used for each stage 102. A multiple phase converter (three phase or a four phase converter, as examples) other than a two phase converter may be used, in other embodiments of the invention. A single converter stage may be used in some embodiments of he invention. Other control schemes than the current mode control scheme described herein may be used in some embodiments of the invention. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A voltage regulation system comprising:
   switching regulator circuits, each regulator circuit having an associated inductive element and providing a voltage across the associated inductive element; and
   a controller coupled to the switching regulator circuits to:
   cause the switching regulator circuits to operate at different switching phases,
   construct indications of currents from the voltages across the associated inductive elements, and
   control operations of the switching regulator circuits to regulate an output voltage of the system in response to the indications.

2. The voltage regulation system of claim 1, wherein at least one of the currents comprises a current in one of the inductive elements.

3. The voltage regulation system of claim 1, wherein at least one of the currents comprises a DC component of a current in one of the inductive elements.

4. The voltage regulation system of claim 1, wherein at least one of the currents comprises an AC component of a current in one of the inductive elements.

5. The voltage regulation system of claim 1, wherein the controller operates the switching regulator circuits to implement a current mode control scheme.

6. The voltage regulation system of claim 1, wherein at least one of the inductive elements comprises a resistance and the voltage across said at least one of the inductive elements comprises a voltage drop across the resistance.

7. The voltage regulation system of claim 1, wherein the controller comprises:
   at least one low pass filter to receive an indication of one of the voltages and produce a component of the indication of the current in the associated inductive element.

8. The voltage regulation system of claim 1, wherein the controller comprises:
   at least one band pass filter to receive an indication of one of the voltages and produce a signal; and
   an integrator to integrate the signal to produce a component of the indication of the current in the associated inductive element.

9. The voltage regulation system of claim 1, wherein the controller comprises:
   at least one integrator to integrate an indication of one of the voltages to produce a component of the indication of the current in the associated inductive storage element.

10. The voltage regulation system of claim 1, wherein the voltage provided by each regulator circuit has an inductive voltage component and the controller constructs the indications of currents using at least the inductive voltage components.

* * * * *